(12) United States Patent
Wang et al.

(10) Patent No.: US 9,730,080 B2
(45) Date of Patent: Aug. 8, 2017

(54) NETWORK COVERAGE PLANNING METHOD AND APPARATUS OF EVOLUTION COMMUNICATION SYSTEM

(71) Applicant: DATANG MOBILE COMMUNICATIONS EQUIPMENT CO., LTD, Beijing (CN)

(72) Inventors: Yueqian Wang, Shanghai (CN); Shuling Li, Shanghai (CN); Bing Han, Shanghai (CN)

(73) Assignee: DATANG MOBILE COMMUNICATIONS EQUIPMENT CO., LTD (CN)

( * ) Notice: Subject to any disclaimer, the term of this patent is extended or adjusted under 35 U.S.C. 154(b) by 0 days.

(21) Appl. No.: 14/652,596

(22) PCT Filed: Jul. 30, 2013

(86) PCT No.: PCT/CN2013/080398
§ 371 (c)(1),
(2) Date: Jun. 16, 2015

(87) PCT Pub. No.: WO2014/094431
PCT Pub. Date: Jun. 26, 2014

(65) Prior Publication Data
US 2015/0350923 A1    Dec. 3, 2015

(30) Foreign Application Priority Data

Dec. 20, 2012   (CN) .......................... 2012 1 0560840

(51) Int. Cl.
*H04W 16/22*    (2009.01)
*H04W 16/18*    (2009.01)
*H04W 24/06*    (2009.01)

(52) U.S. Cl.
CPC ............ *H04W 16/18* (2013.01); *H04W 16/22* (2013.01); *H04W 24/06* (2013.01)

(58) Field of Classification Search
CPC ..................................................... H04W 16/22
See application file for complete search history.

(56) References Cited

U.S. PATENT DOCUMENTS

| 2010/0305931 | A1* | 12/2010 | Fordham | ............... | H04W 16/18 |
|---|---|---|---|---|---|
| | | | | | 703/13 |
| 2012/0294173 | A1* | 11/2012 | Su | .......................... | H04W 24/10 |
| | | | | | 370/252 |
| 2013/0237244 | A1* | 9/2013 | Siomina | ................ | G01S 5/0252 |
| | | | | | 455/456.1 |

FOREIGN PATENT DOCUMENTS

| CN | 1845631 A | 10/2006 |
|---|---|---|
| CN | 102307357 A | 1/2012 |

(Continued)

*Primary Examiner* — John Blanton
(74) *Attorney, Agent, or Firm* — Morriss O'Bryant Compagni, PC

(57) ABSTRACT

The present invention provides a network coverage planning method and apparatus of an evolution communication system, wherein the method includes: obtaining the theoretical coverage parameter of a single base station of the evolution communication system by link budget; obtaining the theoretical coverage parameter of an entire network of the evolution communication system by network stimulation; calculating a reception level value of the evolution communication system under the wireless environment of a current network communication system in the same planning area to estimate a simulative measured coverage parameter of the evolution communication system; and planning the coverage parameter of the entire network of the evolution communication system according to the theoretical coverage (Continued)

parameter of the single base station, the theoretical coverage parameter of the entire network and the simulative measured coverage parameter.

18 Claims, 2 Drawing Sheets

(56) References Cited

FOREIGN PATENT DOCUMENTS

| | | |
|---|---|---|
| CN | 102523590 A | 6/2012 |
| CN | 102625323 A | 8/2012 |
| CN | 103052081 A | 4/2013 |
| WO | 2011109918 A1 | 9/2011 |

* cited by examiner

NETWORK COVERAGE PLANNING METHOD AND APPARATUS OF EVOLUTION COMMUNICATION SYSTEM

CROSS-REFERENCE TO RELATED APPLICATIONS

This application is a national phase entry under 35 U.S.C. §371 of PCT/CN2013/080398 filed on Jul. 30, 2013, which claims priority to Chinese Patent Application No. 201210560840.4 filed on Dec. 12, 2012, the entirety of each of which is incorporated by this reference.

TECHNICAL FIELD

The present invention relates to the technical field of mobile communications, and particularly relates to a network coverage planning method and apparatus of an evolution communication system.

BACKGROUND

In the existing network coverage planning of an evolution communication system, the main coverage planning means is to perform theoretical estimation and planning via link budget and system simulation. Wherein a variety of factors will result in that the actual coverage effect of the theoretically obtained coverage planning falls short of the expected target. For example, a complex wireless environment (shelter, refraction or the like of trees, buildings and large vehicles), a user service use habit and a user distribution condition are difficult to be accurately simulated by a propagation model, and errors inevitably exist in the calibration test, loss estimation, interference estimation, map accuracy and the like of the propagation model. Since the theoretically guided coverage planning is carried out prior to network creation, the accuracy thereof could not be verified by actual tests, and after the network planning construction is completed, a high price should be paid for modifying the planning design once it is found that the planning falls short of the expected target.

Therefore, in the current network coverage planning of the evolution communication system, the coverage performance generally falls short of the expected target after network creation, and the following problems are particularly liable to occur: shrunk coverage of a particular area after the network creation, weak coverage of the area edge capable of being continuously covered in the original planning and more dropped calls of users; or deep coverage requirements could not be satisfied, and the proportion of a reception level value reported by a terminal falls short of the expected requirements. These have a greater impact on such KPI indexes as cell throughput, edge rate, call drop rate and the like, moreover, if the network coverage planning is changed by such means as modifying and supplementing site locations and the like after the communication network construction is completed, it is high in cost and difficult to implement, and adverse influence is brought to network operation.

SUMMARY

1. Technical Problems to be Solved

As to the above-mentioned defects, the technical problem to be solved in the present invention is to provide a network coverage planning method and apparatus of an evolution communication system, which may be used for effectively improving the condition that the actual coverage effect falls short of the expected target after network creation based on theoretical coverage planning, obviously improving the coverage performance of the evolution communication system and being closer to the expected coverage target after network creation.

2. Technical Solutions

To solve the above-mentioned technical problem, the present invention provides a network coverage planning method of an evolution communication system, including:

A. obtaining a theoretical coverage parameter of a single base station of the evolution communication system by link budget;

B. obtaining a theoretical coverage parameter of an entire network of the evolution communication system by network stimulation;

C. calculating a reception level value of the evolution communication system under a wireless environment of a current network communication system in the same planning area to estimate a simulative measured coverage parameter of the evolution communication system, by adopting measurement report data of a terminal in the current network communication system corresponding to the evolution communication system and a relationship of reception levels of the current network communication system and the evolution communication system;

D. planning the coverage parameter of the entire network of the evolution communication system according to the theoretical coverage parameter of the single base station, the theoretical coverage parameter of the entire network and the simulative measured coverage parameter.

Optionally, the theoretical coverage parameter of the single base station includes a maximum coverage distance of the single base station, a station spacing and an antenna height; the theoretical coverage parameter of the entire network includes coverage of the entire network, the number of sites, site locations and an antenna height; the simulative measured coverage parameter includes coverage, the number of sites, site locations and an antenna height; and the actual coverage parameter of the entire network includes the coverage of the entire network, the number of sites, site locations and an antenna height.

Optionally, the obtaining the theoretical coverage parameter of a single base station of the evolution communication system by link budget specifically includes:

according to the edge rate and the edge reception level covered by the single base station, estimating a maximum allowable path loss of the single base station under various environments, and estimating the maximum coverage distance or station spacing of the single base station under the wireless environment by selecting a proper propagation model or a propagation model correction result.

Optionally, the obtaining the theoretical coverage parameter of an entire network of the evolution communication system by network stimulation specifically includes:

simulating by using a network planning tool to obtain a simulation result map of entire network reference signal receiving power of the evolution communication system on a current network site location, performing site supplement planning on the areas which do not satisfy that the reference signal receiving power is larger than a preset value in the map according to the coverage effect displayed by the simulation map of entire network reference signal receiving power, and simulating the coverage effect again after site supplement until the simulative distribution of the reference signal receiving power of the evolution communication system satisfies that the reference signal receiving power value of a preset proportion of areas is larger than the preset value.

Optionally, the preset value is −100 dBm; the preset proportion is 95%.

Optionally, the relationship of the reception levels of the current network communication system and the evolution communication system is determined by the following formula:

$$RSRP=RSCP-PCCPCH\ power+CRS\ power-L\_path\ loss\ difference$$

wherein, PCCPCH power refers to primary common control physical channel power in the current network communication system, CRS power refers to cell reference signal power in the evolution communication system, and L_path loss difference refers to the difference of the path loss of the current network communication system and the evolution communication system and is determined by the following formula:

$$L\_path\ loss\ difference=L\_evolution-L\_current\ network,$$

$L=46.3+33.9*\log(f)-13.82*\log(Hbs)-a(Hms)+(44.9-6.55*\log(Hbs))*\log(d)+Cm$, wherein L refers to path loss, L_evolution refers to the path loss of the evolution communication system, L_current network refers to the path loss of the current network communication system, f refers to a frequency point, Hbs refers to a base station height, Hms refers to a terminal height, a(Hms) refers to a correction factor of the terminal, and Cm refers to a city correction factor, RSRP refers to the reception level of the evolution communication system and is determined by the following formula:

$$RSRP=CRS\ power+antenna\ gain-shadow\ fading\ margin-L\_evolution,$$

RSCP refers to the reception level of the current network communication system and is determined by the following formula:

$$RSCP=PCCPCH\ power+antenna\ gain-shadow\ fading\ margin-L\_current\ network.$$

Optionally, the evolution communication system is a TD-LET system, and the current network communication system is a TD-SCDMA system.

The present invention further provides a network coverage planning apparatus of an evolution communication system, including:

a link budget module, configured to obtain a theoretical coverage parameter of a single base station of the evolution communication system by adopting link budget;

a network stimulation module, configured to obtain a theoretical coverage parameter of an entire network of the evolution communication system by adopting network stimulation;

a simulative measurement calculating module, configured to calculate a reception level value of the evolution communication system under wireless environment of a current network communication system in the same planning area to estimate a simulative measured coverage parameter of the evolution communication system, by adopting measurement report data of a terminal in the current network communication system corresponding to the evolution communication system and a relationship of reception levels of the current network communication system and the evolution communication system;

a comprehensive adjusting module, configured to plan the coverage parameter of the entire network of the evolution communication system according to the theoretical coverage parameter of the single base station, the theoretical coverage parameter of the entire network and the simulative measured coverage parameter.

Optionally, the theoretical coverage parameter of the single base station includes a maximum coverage distance of the single base station, a station spacing and an antenna height; the theoretical coverage parameter of the entire network includes coverage of the entire network, the number of sites, site locations and an antenna height; the simulative measured coverage parameter includes coverage, the number of sites, site locations and an antenna height; and the actual coverage parameter of the entire network includes the coverage of the entire network, the number of sites, site locations and an antenna height.

Optionally, the link budget module is further configured to:

according to the edge rate and the edge reception level covered by the single base station, estimate a maximum allowable path loss of the single base station under various environments, and estimate the maximum coverage distance or station spacing of the single base station under the wireless environment by selecting a proper propagation model or a propagation model correction result.

Optionally, the network stimulation module is further configured to:

simulate by using a network planning tool to obtain a simulation result map of entire network reference signal receiving power of the evolution communication system on a current network site location, perform site supplement planning on the areas which do not satisfy that the reference signal receiving power is larger than a preset value in the map according to the coverage effect displayed by the simulation map of entire network reference signal receiving power, and simulate the coverage effect again after site supplement until the simulative distribution of the reference signal receiving power of the evolution communication system satisfies that the reference signal receiving power value of a preset proportion of areas is larger than the preset value.

Optionally, the preset value is −100 dBm; the preset proportion is 95%.

Optionally, the relationship of the reception levels of the current network communication system and the evolution communication system is determined by the following formula:

$$RSRP=RSCP-PCCPCH\ power+CRS\ power-L\_path\ loss\ difference$$

wherein, PCCPCH power refers to primary common control physical channel power in the current network communication system, CRS power refers to cell reference signal power in the evolution communication system, and L_path loss difference refers to the difference of the path loss of the current network communication system and the evolution communication system and is determined by the following formula:

$$L\_path\ loss\ difference=L\_evolution-L\_current\ network,$$

$L=46.3+33.9*\log(f)-13.82*\log(Hbs)-a(Hms)\pm(44.9-6.55*\log(Hbs))*\log(d)+Cm$, wherein L refers to path loss, L_evolution refers to the path loss of the evolution communication system, L_current network refers to the path loss of the current network communication system, f refers to a frequency point, Hbs refers to a base station height, Hms refers to a terminal height, a(Hms) refers to a correction factor of the terminal, and Cm refers to a city correction factor, RSRP refers to the reception level of the evolution communication system and is determined by the following formula:

RSRP=CRS power+antenna gain−shadow fading margin−L_evolution,

RSCP refers to the reception level of the current network communication system and is determined by the following formula:

RSCP=PCCPCH power+antenna gain−shadow fading margin−L_current network.

Optionally, the evolution communication system is a TD-LET system, and the current network communication system is a TD-SCDMA system.

3. Beneficial Effects

In the present invention, the network coverage planning of the evolution communication system is performed by means of the actual measurement report of the terminal in the current network operating communication system, thus ensuring more accurate network coverage planning, effectively improving the condition that the actual coverage effect falls short of the expected planning target after network creation based on theoretical coverage planning and is closer to the expected coverage target after network creation.

DETAILED DESCRIPTION OF THE PREFERRED EMBODIMENTS

A further detailed illustration of the specific embodiments of the present invention will be given below in combination with accompanying drawings and embodiments. The following embodiments are used for illustrating the present invention, rather than limiting the scope of the present invention.

Figure 1:
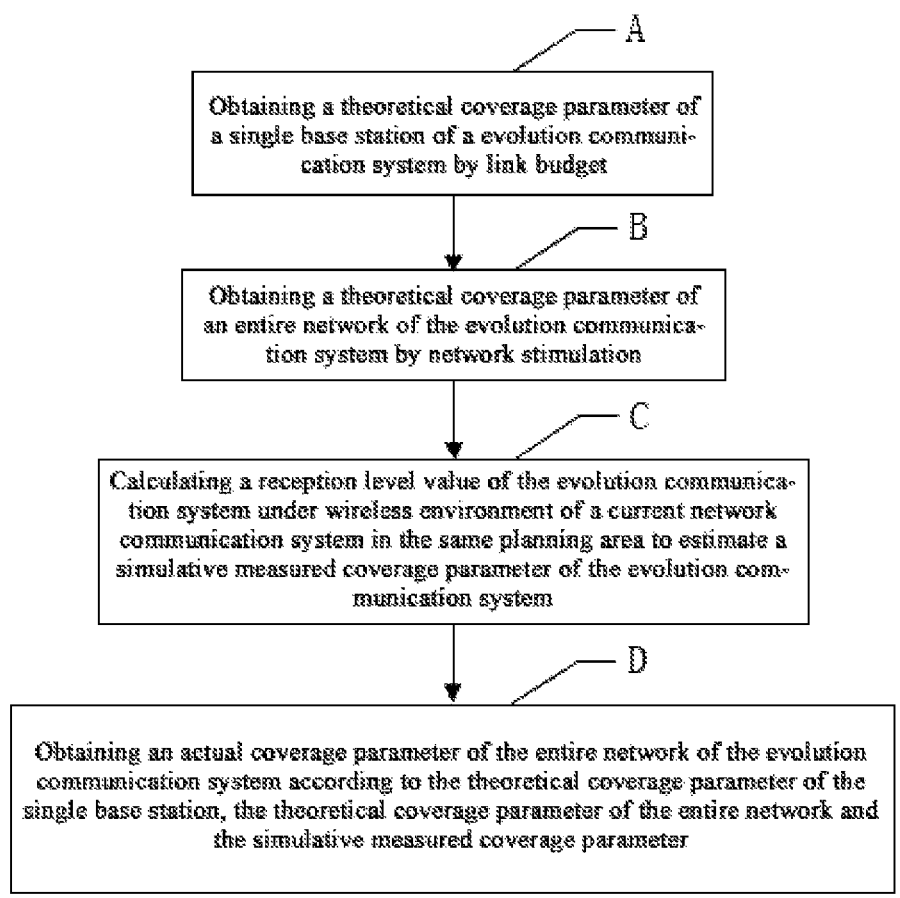
FIG. 1 is a flowchart of a network coverage planning method of the evolution communication system according to an embodiment of the present invention.

Refer to FIG. 1, the present invention provides a network coverage planning method of an evolution communication system, including:

A. obtaining a theoretical coverage parameter of a single base station of the evolution communication system by link budget, for example, rough base station scale estimation parameters, such as the maximum coverage distance of the single base station, a station spacing, an antenna height, and the like;

B. obtaining a theoretical coverage parameter of an entire network of the evolution communication system by network stimulation;

C. calculating a reception level value of the evolution communication system under wireless environment of a current network communication system in the same planning area to estimate a simulative measured coverage parameter of the evolution communication system, by adopting measurement report (Measurement Report, referred to as MR) data of a terminal in the current network communication system corresponding to the evolution communication system and the relationship of reception levels of the current network communication system and the evolution communication system, i.e., estimating the coverage condition of the evolution communication system in combination with the current network measurement result;

D. planning the coverage parameter of the entire network of the evolution communication system according to the theoretical coverage parameter of the single base station, the theoretical coverage parameter of the entire network and the simulative measured coverage parameter, for example, performing coverage planning on the coverage of the evolution communication system, the number of sites, site locations, the antenna height, etc.

Preferably, the theoretical coverage parameter of the single base station includes the maximum coverage distance of the single base station, a station spacing and an antenna height; the theoretical coverage parameter of the entire network includes the coverage of the entire network, the number of sites, site locations and an antenna height; the simulative measured coverage parameter includes coverage, the number of sites, site locations and an antenna height; and the actual coverage parameter of the entire network includes the coverage of the entire network, the number of sites, site locations and an antenna height.

Preferably, the obtaining the theoretical coverage parameter of a single base station of the evolution communication system by link budget specifically includes:

according to the edge rate and the edge reception level covered by the single base station, estimating the maximum allowable path loss of the single base station under various environments, and estimating the maximum coverage distance or station spacing of the single base station under the wireless environment by selecting a proper propagation model or a propagation model correction result.

Preferably, the obtaining the theoretical coverage parameter of an entire network of the evolution communication system by network stimulation specifically includes:

simulating by using a network planning tool to obtain a simulation result map of entire network reference signal receiving power of the evolution communication system on a current network site location, performing site supplement planning on the areas which do not satisfy that the reference signal receiving power is larger than a preset value in the map according to the coverage effect displayed by the simulation map of entire network reference signal receiving power, and simulating the coverage effect again after site supplement until the simulative distribution of the reference signal receiving power of the evolution communication system satisfies that the reference signal receiving power value of a preset proportion of areas is larger than the preset value.

Preferably, the preset value is −100 dBm; the preset proportion is 95%.

Preferably, the relationship of the reception levels of the current network communication system and the evolution communication system is determined by the following formula:

RSRP=RSCP−PCCPCH power+CRS power−L_path loss difference wherein, PCCPCH power refers to primary common control physical channel power in the current network communication system, CRS power refers to cell reference signal power in the evolution communication system, and L_path loss difference refers to the difference of the path loss of the current network communication system and the evolution communication system and is determined by the following formula:

$$L\_path\ loss\ difference = L\_evolution - L\_current\ network,$$

$L=46.3+33.9*\log(f)-13.82*\log(Hbs)-a(Hms)+(44.9-6.55*\log(Hbs))*\log(d)+Cm$, wherein L refers to path loss, L_evolution refers to the path loss of the evolution communication system, L_current network refers to the path loss of the current network communication system, f refers to a frequency point, Hbs refers to a base station height, Hms refers to a terminal height, a(Hms) refers to a correction factor of the terminal, and Cm refers to a city correction factor, RSRP refers to the reception level of the evolution communication system and is determined by the following formula:

$$RSRP = CRS\ power + antenna\ gain - shadow\ fading\ margin - L\_evolution,$$

RSCP refers to the reception level of the current network communication system and is determined by the following formula:

$$RSCP = PCCPCH\ power + antenna\ gain - shadow\ fading\ margin - L\_current\ network.$$

Figure 2:
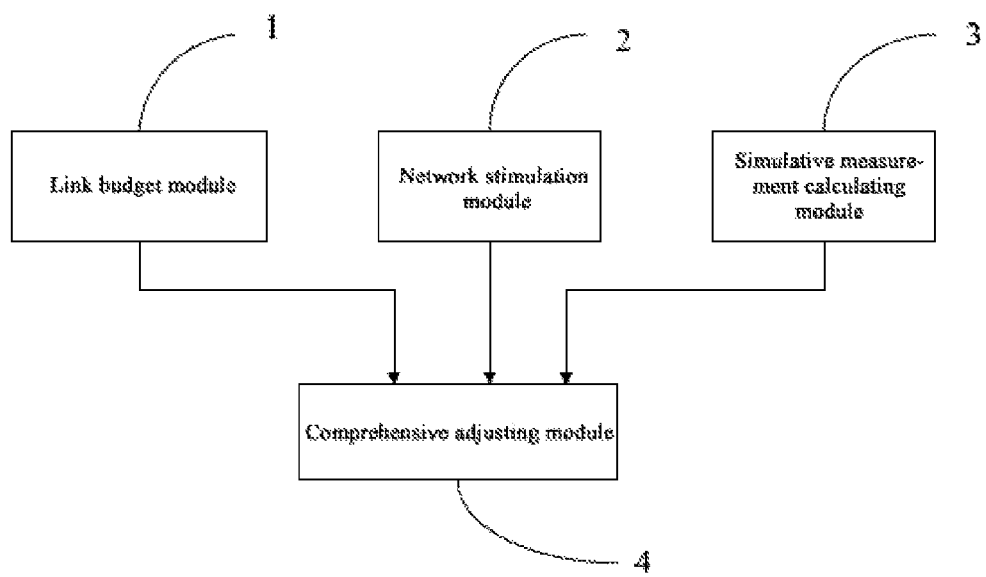
FIG. 2 is a structure diagram of a network coverage planning apparatus of the evolution communication system according to the embodiment of the present invention.

The present invention further provides a network coverage planning apparatus of an evolution communication system, as shown in FIG. 2, including:

a link budget module 1, configured to obtain a theoretical coverage parameter of a single base station of the evolution communication system by adopting link budget;

a network stimulation module 2, configured to obtain a theoretical coverage parameter of an entire network of the evolution communication system by adopting network stimulation;

a simulative measurement calculating module 3, configured to calculate a reception level value of the evolution communication system under wireless environment of a current network communication system in the same planning area to estimate a simulative measured coverage parameter of the evolution communication system, by adopting measurement report data of a terminal in the current network communication system corresponding to the evolution communication system and a relationship of reception levels of the current network communication system and the evolution communication system;

a comprehensive adjusting module 4, configured to plan the coverage parameter of the entire network of the evolution communication system according to the theoretical coverage parameter of the single base station, the theoretical coverage parameter of the entire network and the simulative measured coverage parameter.

Preferably, the theoretical coverage parameter of the single base station includes the maximum coverage distance of the single base station, a station spacing and an antenna height; the theoretical coverage parameter of the entire network includes the coverage of the entire network, the number of sites, site locations and an antenna height; the simulative measured coverage parameter includes coverage, the number of sites, site locations and an antenna height; and the actual coverage parameter of the entire network includes the coverage of the entire network, the number of sites, site locations and an antenna height.

Preferably, the link budget module is further configured to:

according to the edge rate and the edge reception level covered by the single base station, estimate the maximum allowable path loss of the single base station under various environments, and estimate the maximum coverage distance or station spacing of the single base station under the wireless environment by selecting a proper propagation model or a propagation model correction result.

Preferably, the network stimulation module is further configured to:

simulate by using a network planning tool to obtain a simulation result map of entire network reference signal receiving power of the evolution communication system on a current network site location, perform site supplement planning on the areas which do not satisfy that the reference signal receiving power is larger than a preset value in the map according to the coverage effect displayed by the simulation map of entire network reference signal receiving power, and simulate the coverage effect again after site supplement until the simulative distribution of the reference signal receiving power of the evolution communication system satisfies that the reference signal receiving power value of a preset proportion of areas is larger than the preset value.

Preferably, the preset value is −100 dBm; the preset proportion is 95%.

Preferably, the relationship of the reception levels of the current network communication system and the evolution communication system is determined by the following formula:

$$RSRP = RSCP - PCCPCH\ power + CRS\ power - L\_path\ loss\ difference$$

wherein, PCCPCH power refers to primary common control physical channel power in the current network communication system, CRS power refers to cell reference signal power in the evolution communication system, and L_path loss difference refers to the difference of the path loss of the current network communication system and the evolution communication system and is determined by the following formula:

$$L\_path\ loss\ difference = L\_evolution - L\_current\ network,$$

$L=46.3+33.9*\log(f)-13.82*\log(Hbs)-a(Hms)+(44.9-6.55*\log(Hbs))*\log(d)+Cm$, wherein L refers to path loss, L_evolution refers to the path loss of the evolution communication system, L_current network refers to the path loss of the current network communication system, f refers to a frequency point, Hbs refers to a base station height, Hms refers to a terminal height, a(Hms) refers to a correction factor of the terminal, and Cm refers to a city correction factor, RSRP refers to the reception level of the evolution communication system and is determined by the following formula:

$$RSRP = CRS\ power + antenna\ gain - shadow\ fading\ margin - L\_evolution,$$

RSCP refers to the reception level of the current network communication system and is determined by the following formula:

$$RSCP = PCCPCH\ power + antenna\ gain - shadow\ fading\ margin - L\_current\ network.$$

Preferably, the evolution communication system is a TD-LET system, and the current network communication system is a TD-SCDMA system.

By taking it as an example that the current network 3G communication system: TD-SCDMA is evolved and upgraded to the TD-LTE system, how to perform TD-LTE network coverage planning by adopting the network coverage planning method of the evolution communication system in the present invention, i.e., how to complete coverage planning of the TD-LTE system by planning and supplementing the site locations of the existing TD-SCDMA system, will be illustrated below.

Firstly, theoretical link budget is performed to obtain a rough coverage planning of a single station of TD-LTE. According to the requirements of the edge rate and the edge reception level, the maximum allowable path loss of the single station under various environments is estimated, and a proper propagation model or a propagation model correction result is selected to obtain such parameters as the maximum cell coverage distance and the like under a wireless environment, in order to obtain the number of base stations under various covered environments and the approximate scale of the entire network.

Secondly, TD-LTE entire network coverage simulation of the current network site location is performed. Simulation is performed by using a network planning tool to obtain a simulation result map of TD-LTE entire network reference signal receiving power (Reference Signal Receiving Power, referred to as RSRP) of the current network TD-SCDMA site location. Site supplement planning is performed on the areas which do not satisfy that the RSRP is larger than −100 dBm for example according to the coverage effect displayed by the simulation map of entire network RSRP, and the coverage effect is simulated again after site supplement until the RSRP simulative distribution of the LTE network satisfies that the RSRP value of for example 95% of areas is larger than −100 dBm.

Thirdly, the reception level of the TD-LTE system is reckoned according to a measurement report (Measurement Report, referred to as MR) of a TD-SCDMA current network terminal.

The following result is reckoned according to a path loss formula of a COST2311 HATA model:

$$L=46.3+33.9*\log(f)-13.82*\log(Hbs)-a(Hms)+(44.9-6.55*\log(Hbs))*\log(d)+Cm \quad (1)$$

wherein, L refers to path loss, f refers to a frequency point (unit: MHz), Hbs refers to a base station height (unit: m), Hms refers to a terminal height (unit: m), a(Hms) refers to a correction factor of the terminal (unit: dB), and Cm refers to a city correction factor (unit: dB).

If taking the actual operation conditions in a certain network as an example, the TD-LTE band is set as 2600 MHz and the TD-SCDMA band is set as 2016 MHz, then:

$$L\_path\ loss\ difference=L\_lte-L\_td=33.9*(lg(f\_lte)-lg(f\_td))=3.745(dB) \quad (2)$$

The following result is calculated from the reception level:

$$TD\text{-}LTE: RSRP=CRS\ power+antenna\ gain-shadow\ fading\ margin-L\_lte \quad (3)$$

$$TD\text{-}SCDMA: RSCP=PCCPCH\ power+antenna\ gain-shadow\ fading\ margin-L\_td \quad (4)$$

wherein, the shadow fading margins of the two communication systems under the same wireless environment are the same, for example, if bimodal FAD antennas are adopted, the antenna gains are the same. The power of cell-specific reference signals (CRS: Cell-specific reference signals) is the cell reference signal power in the TD-LTE system, the power of PCCPCH (Primary Common Control Physical Channel) is the power of the primary common control physical channel in the TD-SCDMA system, and the power values of the two parts may be configured in the network. Therefore, the relationship of the reception levels of TD-SCDMA and TD-LTE is obtained:

$$RSRP=RSCP-PCCPCH\ power+CRS\ power-L\_path\ loss\ difference \quad (5)$$

$$namely, RSRP=RSCP-PCCPCH\ power+CRS\ power-3.745 \quad (6)$$

By means of the relationship of the reception levels of the foregoing two systems, the PCCPCH power configured in the current network and the CRS power (the maximum value of 15 dBm may be selected for 8 antennas at the early network planning stage generally) configured in the TD-LTE are guided into the formula 6 to reckon the TD-LTE RSRP distribution conditions of the cells via the MR data actually measured and reported by the cells in the TD-SCDMA current network in a planning area.

A specific planning example is given below: a RSCP threshold satisfying the cell coverage requirements is screened according to the collected MR data (i.e., RSCP sample values of the terminals of a large number of current networks within a long term, provided by an operator) of the normally operating TD-SCDMA network in accordance with the area coverage of 95% of the cells, and a RSRP distribution diagram drawn based on the RSRP values with respect to the area coverage of 95% of the cells in the LTE network is reckoned according to the relationship of the reception levels of the TD-SCDMA and the TD-LTE in formula 6. According to the coverage requirements of the TD-LTE network: more than 95% of common reference signal receiving power RSRP within a target area is larger than −100 dBm, the building penetration loss is set as 15 dB, and a 15 dB margin is reserved for the reckoned RSRP, i.e., the RSRP threshold satisfying the coverage is −115 dBm. Thus, for the reckoned areas dissatisfying the TD-LTE network coverage requirements, site locations need to be supplemented herein to reinforce the coverage. For example, 75 sites need to be supplemented on the current network site locations during coverage planning reckoned by actual measurement MR, wherein 55 sites are overlapped with site supplement areas recommended by theoretical planning, and the other 20 supplemented sites are more sites additionally added on the basis of the current network MR coverage planning than the traditional theoretical planning by adopting the solution.

Fourthly, by means of the link budget, the simulation, the actually measured MR data reckon of the current network, a final LTE network coverage planning is obtained by comprehensively analyzing the results of the three parts. After the analysis, the number of the base stations planned by the traditional theoretical planning method is less than the number of the base stations planned by the solution combining the current network measurement report. It is found in the field survey on 20 different sites of the two methods by operators that, the positions of most base stations exceeding the traditional coverage planning part are located at sheltered positions or positions with large people and vehicle density actually, while software simulation could not accurately simulate these factors, thus resulting in inaccurate theoretical coverage planning In the present invention, the TD-LTE network coverage planning is performed by adopting TD-SCDMA terminal measurement, the proportion of the RSRP larger than −100 dBm within the planning area is increased by 3% compared with that in the traditional coverage planning solution, therefore the coverage performance is obviously improved compared with that of the traditional planning method.

Therefore, at the early construction stage of an evolution network, by adopting the coverage planning method and apparatus combining theory with current network in the present invention, the difference between expected coverage performance of the planning and the coverage performance after network creation may be effectively reduced, the coverage planning accuracy is improved, and the coverage performance of the evolution network is perfected and improved. The present invention may also be directly applied to network planning tool software.

To sum up, the present invention discloses a network coverage planning method and apparatus of an evolution communication system. Under the currently common application scenario that the existing current network communication system needs to be upgraded to the evolution communication system, on the basis of performing theoretical network coverage planning via link budget and network simulation, a coverage planning method of reckoning the reception level of the evolution system according to the actual MR measurement report value of the terminal of the current network communication system is added, this method is simple, convenient and intuitionistic. When performing the subsequent network coverage planning of the evolution communication system, the method may be used for effectively improving the condition that the actual coverage effect falls short of the expected planning target after the traditional network creation based on theoretical coverage planning, obviously improving the coverage performance of the evolution communication system and being closer to the expected coverage target after network creation.

The above-mentioned embodiments are merely used for illustrating the present invention, rather than limiting the present invention. Those of ordinary skill in the related technical art could think of a variety of deformations and variations without departing from the spirit and scope of the present invention. Accordingly, all equivalent technical solutions belong to the scope of the present invention, and the patent protection scope of the present invention should be defined by the claims.

The invention claimed is:

1. A network coverage planning method of an evolution communication system, comprising:
   obtaining a theoretical coverage parameter of a single base station of the evolution communication system by link budget;
   obtaining a theoretical coverage parameter of an entire network of the evolution communication system by network stimulation;
   calculating a reception level value of the evolution communication system under wireless environment of a current network communication system in the same planning area to estimate a simulative measured coverage parameter of the evolution communication system, by adopting measurement report data of a terminal in the current network communication system corresponding to the evolution communication system and a relationship of reception levels of the current network communication system and the evolution communication system; and
   planning the coverage parameter of the entire network of the evolution communication system according to the theoretical coverage parameter of the single base station, the theoretical coverage parameter of the entire network and the simulative measured coverage parameter;
   wherein the theoretical coverage parameter of the single base station comprises a maximum coverage distance of the single base station, a station spacing and an antenna height; the theoretical coverage parameter of the entire network comprises coverage of the entire network, the number of sites, site locations and an antenna height; the simulative measured coverage parameter comprises coverage, the number of sites, site locations and an antenna height; and the actual coverage parameter of the entire network comprises coverage of the entire network, the number of sites, site locations and an antenna height.

2. The network coverage planning method of claim 1, wherein the obtaining the theoretical coverage parameter of the single base station of the evolution communication system by link budget specifically comprises:
   according to the edge rate and the edge reception level covered by the single base station, estimating a maximum allowable path loss of the single base station under various environments, and estimating the maximum coverage distance or station spacing of the single base station under the wireless environment by selecting a proper propagation model or a propagation model correction result.

3. The network coverage planning method of claim 1, wherein the obtaining the theoretical coverage parameter of an entire network of the evolution communication system by network stimulation specifically comprises:
   simulating by using a network planning tool to obtain a simulation result map of entire network reference signal receiving power of the evolution communication system on a current network site location, performing site supplement planning on the areas which do not satisfy that the reference signal receiving power is larger than a preset value in the map according to the coverage effect displayed by the simulation map of entire network reference signal receiving power, and simulating the coverage effect again after site supplement until the simulative distribution of the reference signal receiving power of the evolution communication system satisfies that the reference signal receiving power value of a preset proportion of areas is larger than the preset value.

4. The network coverage planning method of claim 3, wherein the preset value is −100 dBm; the preset proportion is 95%.

5. The network coverage planning method of claim 1, wherein the relationship of the reception levels of the current network communication system and the evolution communication system is determined by the following formula:

$$RSRP = RSCP - PCCPCH\ power + CRS\ power - L\_path\ loss\ difference$$

wherein, PCCPCH power refers to primary common control physical channel power in the current network communication system, CRS power refers to cell reference signal power in the evolution communication system, and L_path loss difference refers to the difference of the path loss of the current network communication system and the evolution communication system and is determined by the following formula:

$$L\_path\ loss\ difference = L\_evolution - L\_current\ network,$$

L=46.3+33.9*log(f)−13.82*log(Hbs)−a(Hms)+(44.9−6.55*log(Hbs))*log(d)+Cm, wherein L refers to path loss, L_evolution refers to the path loss of the evolution communication system, L_current network refers to the path loss of the current network communication system, f refers to a frequency point, Hbs refers to a base station height, Hms refers to a terminal height, a(Hms) refers to a correction factor of the terminal, and Cm refers to a city correction factor, RSRP refers to the reception level of the evolution communication system and is determined by the following formula:

RSRP=CRS power+antenna gain−shadow fading margin−L_evolution,

RSCP refers to the reception level of the current network communication system and is determined by the following formula:

RSCP=PCCPCH power+antenna gain−shadow fading margin−L_current network.

6. The network coverage planning method of claim 1, wherein the evolution communication system is a TD-LTE system, and the current network communication system is a TD-SCDMA system.

7. A network coverage planning apparatus of an evolution communication system, comprising:
at least one processor that executes the functions of the following modules:
a link budget module obtaining a theoretical coverage parameter of a single base station of the evolution communication system by adopting link budget;
a network stimulation module obtaining a theoretical coverage parameter of an entire network of the evolution communication system by adopting network stimulation;
a simulative measurement calculating module calculating a reception level value of the evolution communication system under wireless environment of a current network communication system in the same planning area to estimate a simulative measured coverage parameter of the evolution communication system, by adopting measurement report data of a terminal in the current network communication system corresponding to the evolution communication system and a relationship of reception levels of the current network communication system and the evolution communication system; and
a comprehensive adjusting module planning the coverage parameter of the entire network of the evolution communication system according to the theoretical coverage parameter of the single base station, the theoretical coverage parameter of the entire network and the simulative measured coverage parameter;
wherein the theoretical coverage parameter of the single base station comprises a maximum coverage distance of the single base station, a station spacing and an antenna height; the theoretical coverage parameter of the entire network comprises coverage of the entire network, the number of sites, site locations and an antenna height; the simulative measured coverage parameter comprises coverage, the number of sites, site locations and an antenna height; and the actual coverage parameter of the entire network comprises coverage of the entire network, the number of sites, site locations and an antenna height.

8. The network coverage planning apparatus of claim 7, wherein the at least one processor that executes the function of the link budget module, according to the edge rate and the edge reception level covered by the single base station, estimates a maximum allowable path loss of the single base station under various environments, and estimates the maximum coverage distance or station spacing of the single base station under the wireless environment by selecting a proper propagation model or a propagation model correction result.

9. The network coverage planning apparatus of claim 7, wherein the at least one processor that executes the function of the network stimulation module uses a network planning tool to obtain a simulation result map of entire network reference signal receiving power of the evolution communication system on a current network site location, performs site supplement planning on the areas which do not satisfy that the reference signal receiving power is larger than a preset value in the map according to the coverage effect displayed by the simulation map of entire network reference signal receiving power, and simulates the coverage effect again after site supplement until the simulative distribution of the reference signal receiving power of the evolution communication system satisfies that the reference signal receiving power value of a preset proportion of areas is larger than the preset value.

10. The network coverage planning apparatus of claim 9, wherein the preset value is −100 dBm; the preset proportion is 95%.

11. The network coverage planning apparatus of claim 7, wherein the relationship of the reception levels of the current network communication system and the evolution communication system is determined by the at least one processor using the following formula: RSRP=RSCP−PCCPCH power +CRS power−L_path loss difference wherein, PCCPCH power refers to primary common control physical channel power in the current network communication system, CRS power refers to cell reference signal power in the evolution communication system, and L_path loss difference refers to the difference of the path loss of the current network communication system and the evolution communication system and is determined by the at least one processor using the following formula:

L_path loss difference=L_evolution−L_current network,

L=46.3+33.9*log(f)−13.82*log(Hbs)−a(Hms)+(44.9−6.55*log(Hbs))*log(d)+Cm, wherein L refers to path loss, L_evolution refers to the path loss of the evolution communication system, L_current network refers to the path loss of the current network communication system, f refers to a frequency point, Hbs refers to a base station height, Hms refers to a terminal height, a(Hms) refers to a correction factor of the terminal, and Cm refers to a city correction factor, RSRP refers to the reception level of the evolution communication system and is determined by the at least one processor using the following formula:

RSRP=CRS power+antenna gain−shadow fading margin−L_evolution,

RSCP refers to the reception level of the current network communication system and is determined by the at least one processor using the following formula:

RSCP=PCCPCH power+antenna gain−shadow fading margin−L_current network.

12. The network coverage planning apparatus of claim 7, wherein the evolution communication system is a TD-LTE system, and the current network communication system is a TD-SCDMA system.

13. A network coverage planning method of an evolution communication system, comprising:
    obtaining a theoretical coverage parameter of a single base station of the evolution communication system by link budget;
    obtaining a theoretical coverage parameter of an entire network of the evolution communication system by network stimulation;
    calculating a reception level value of the evolution communication system under wireless environment of a current network communication system in the same planning area to estimate a simulative measured coverage parameter of the evolution communication system, by adopting measurement report data of a terminal in the current network communication system corresponding to the evolution communication system and a relationship of reception levels of the current network communication system and the evolution communication system; and
    planning the coverage parameter of the entire network of the evolution communication system according to the theoretical coverage parameter of the single base station, the theoretical coverage parameter of the entire network and the simulative measured coverage parameter;
    wherein the obtaining the theoretical coverage parameter of an entire network of the evolution communication system by network stimulation specifically comprises simulating by using a network planning tool to obtain a simulation result map of entire network reference signal receiving power of the evolution communication system on a current network site location, performing site supplement planning on the areas which do not satisfy that the reference signal receiving power is larger than a preset value in the map according to the coverage effect displayed by the simulation map of entire network reference signal receiving power, and simulating the coverage effect again after site supplement until the simulative distribution of the reference signal receiving power of the evolution communication system satisfies that the reference signal receiving power value of a preset proportion of areas is larger than the preset value.

14. The network coverage planning method of claim 13, wherein the preset value is −100 dBm; the preset proportion is 95%.

15. The network coverage planning method of claim 13, wherein the relationship of the reception levels of the current network communication system and the evolution communication system is determined by the following formula:
RSRP=RSCP−PCCPCH power+CRS power−L_path loss difference wherein, PCCPCH power refers to primary common control physical channel power in the current network communication system, CRS power refers to cell reference signal power in the evolution communication system, and L_path loss difference refers to the difference of the path loss of the current network communication system and the evolution communication system and is determined by the following formula:

L_path loss difference=L_evolution−L_current network,

L=46.3+33.9*log(f)−13.82*log(Hbs)−a(Hms)+(44.9−6.55*log(Hbs))*log(d)+Cm, wherein L refers to path loss, L_evolution refers to the path loss of the evolution communication system, L_current network refers to the path loss of the current network communication system, f refers to a frequency point, Hbs refers to a base station height, Hms refers to a terminal height, a(Hms) refers to a correction factor of the terminal, and Cm refers to a city correction factor,
RSRP refers to the reception level of the evolution communication system and is determined by the following formula:

RSRP=CRS power+antenna gain−shadow fading margin−L_evolution,

RSCP refers to the reception level of the current network communication system and is determined by the following formula:

RSCP=PCCPCH power+antenna gain−shadow fading margin−L_current network.

16. A network coverage planning apparatus of an evolution communication system, comprising:
    at least one processor that executes the functions of the following modules:
    a link budget module obtaining a theoretical coverage parameter of a single base station of the evolution communication system by adopting link budget;
    a network stimulation module obtaining a theoretical coverage parameter of an entire network of the evolution communication system by adopting network stimulation;
    a simulative measurement calculating module calculating a reception level value of the evolution communication system under wireless environment of a current network communication system in the same planning area to estimate a simulative measured coverage parameter of the evolution communication system, by adopting measurement report data of a terminal in the current network communication system corresponding to the evolution communication system and a relationship of reception levels of the current network communication system and the evolution communication system; and
    a comprehensive adjusting module planning the coverage parameter of the entire network of the evolution communication system according to the theoretical coverage parameter of the single base station, the theoretical coverage parameter of the entire network and the simulative measured coverage parameter;
    wherein the network stimulation module simulates by using a network planning tool to obtain a simulation result map of entire network reference signal receiving power of the evolution communication system on a current network site location, performs site supplement planning on the areas which do not satisfy that the reference signal receiving power is larger than a preset value in the map according to the coverage effect displayed by the simulation map of entire network reference signal receiving power, and simulates the coverage effect again after site supplement until the simulative distribution of the reference signal receiving power of the evolution communication system satisfies that the reference signal receiving power value of a preset proportion of areas is larger than the preset value.

17. The network coverage planning apparatus of claim 16, wherein the preset value is −100 dBm; the preset proportion is 95%.

18. The network coverage planning apparatus of claim 17, wherein the relationship of the reception levels of the current network communication system and the evolution communication system is determined by the at least one processor using thea following formula: RSRP=RSCP−PCCPCH power+CRS power−L_path loss difference wherein, PCCPCH power refers to primary common control physical channel power in the current network communication system, CRS power refers to cell reference signal power in the evolution communication system, and L_path loss difference refers to the difference of the path loss of the current network communication system and the evolution communication system and is determined by the at least one processor using the following formula:

L_path loss difference=L_evolution−L_current network,

L=46.3+33.9*log(f)−13.82*log(Hbs)−a(Hms)+(44.9−6.55*log(Hbs))*log(d)+Cm, wherein L refers to path loss, L_evolution refers to the path loss of the evolution communication system, L_current network refers to the path loss of the current network communication system, f refers to a frequency point, Hbs refers to a base station height, Hms refers to a terminal height, a(Hms) refers to a correction factor of the terminal, and Cm refers to a city correction factor, RSRP refers to the reception level of the evolution communication system and is determined by the at least one processor using the following formula:

RSRP=CRS power+antenna gain−shadow fading margin−L_evolution,

RSCP refers to the reception level of the current network communication system and is determined by the at least one processor using the following formula:

RSCP=PCCPCH power+antenna gain−shadow fading margin−L_current network.

* * * * *